No. 615,823. Patented Dec. 13, 1898.
F. J. DYETT.
BALL BEARING FOR TYPE BARS FOR TYPE WRITING MACHINES.
(Application filed July 29, 1897.)
(No Model.)

Witnesses:

Frank J. Dyett
Inventor
By Edson Bro's
Att'ys.

UNITED STATES PATENT OFFICE.

FRANK J. DYETT, OF ILION, NEW YORK.

BALL-BEARING FOR TYPE-BARS FOR TYPE-WRITING MACHINES.

SPECIFICATION forming part of Letters Patent No. 615,823, dated December 13, 1898.

Application filed July 29, 1897. Serial No. 646,362. (No model.)

*To all whom it may concern:*

Be it known that I, FRANK J. DYETT, a citizen of the United States, residing at Ilion, in the county of Herkimer and State of New York, have invented certain new and useful Improvements in Ball-Bearings for Type-Bars for Type-Writing Machines; and I do hereby declare the following to be a full, clear, and exact description of the invention, such as will enable others skilled in the art to which it appertains to make and use the same.

The nature of the invention consists in providing a peculiar form of ball-bearing for type-bars of type-writing machines and for other purposes.

The object of the invention is to improve the ordinary construction of ball-bearings by using a center ball in place of the cone ordinarily employed in this class of bearings.

Figure 1:
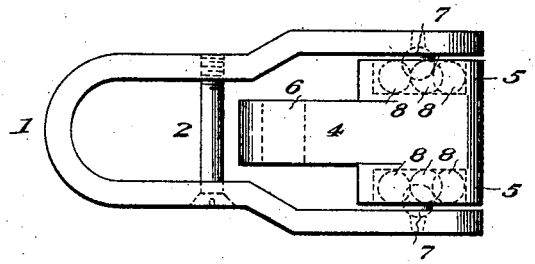
Figure 2:
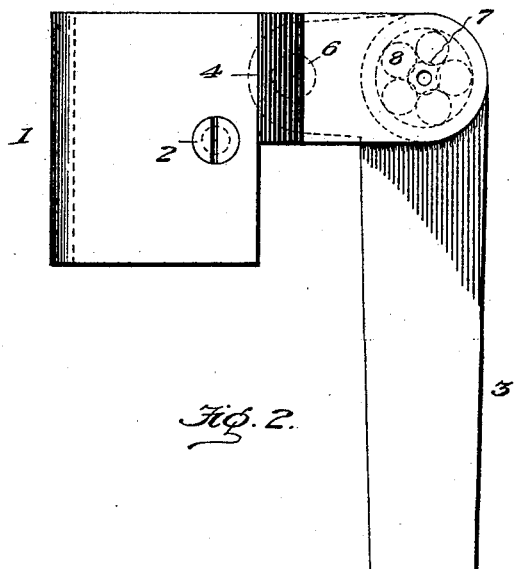
Figure 3:
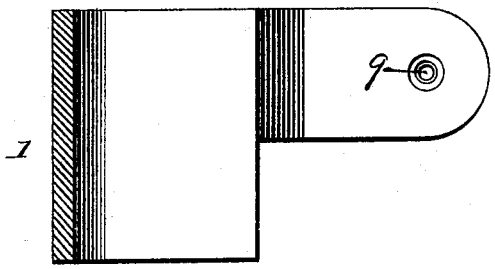

Referring to the drawings forming a part of this specification and on which like numbers of reference indicate corresponding parts in the different views, Figure 1 is a top plan of the yoke or hanger and bearing. Fig. 2 is a side elevation, also showing the type-bar; and Fig. 3 is an inside view of one side of the yoke in elevation, showing the seat or race for the center ball.

1 is the yoke or hanger, which is U-shaped at the rear end, and its side bars, about midway of its length, are extended outwardly in an oblique direction at each side and then extend forward parallel with each other. This is the most desirable form for the yoke; but the precise shape of the yoke is not essential.

Back of the oblique portions of the side bars of the yoke 1 a screw 2 is passed transversely through the side bars, and by the removal of this screw the free end of the yoke 1 may be sufficiently spread apart for the insertion of the ball. 3 is the type-bar, and 4 an arm of the bar. The top end of the type-bar is provided on each of its flat sides with casings or boxes 5, which contain the balls, excepting the center ball, and form seats or races therefor. The arm 4 is apertured at 6, and the connecting-rod to the type-bar lever is pivoted thereto. (Not shown.) 7 is the center ball, and 8 are the remaining balls. As already stated, the balls 8 have their seats or races in the boxes 5 5 and are adapted to turn or rotate therein. The center ball 7 has a seat or race in hemispherical recesses or depressions 9, which are formed at the proper points on the insides of the arms of the yoke, near their front or free ends, as well shown in Fig. 3. These center balls take the place of the cones commonly used in the same relation and form the point or means of articulation of the type-bar. It will be apparent that the bearings might be reversed, if desired—that is to say, the boxes or casings forming the races for the balls 8 might be formed on or secured to the insides of the said bars or arms of the yoke and the hemispherical recesses or races for the center balls might be formed on the sides of the type-bar.

I have shown and described the invention as applied to the type-bar of a type-writing machine; but it is evident that it would be well adapted for other uses where ball-bearings are desirable, and I desire to apply it to such uses whenever it would be practical.

As the central ball has a continual or intermittent rotation instead of being fixed as a central cone, it constantly brings into play a new bearing-surface for the annular series of balls, the advantages of which are apparent.

By my invention I produce a very smoothly-operating and sensitive bearing that is easily and cheaply constructed and very efficient and durable in use and by the use of which friction is reduced to a minimum.

Minor changes within the scope of my invention may be made without departing from the spirit or sacrificing any of the advantages of my invention, in all cases, however, providing a center ball as the means of articulation instead of a cone.

Having thus fully described my invention, what I claim as new, and desire to secure by Letters Patent, is—

1. A ball-bearing for the type-bars of type-writing machines, having a center ball a series of other balls surrounding the same, and races or seats therefor in the type-bar and yoke, substantially as and for the purposes described.

2. A ball-bearing for the type-bars of type-writing machines, having casings secured to the sides of the type-bar, forming races or seats for a series of balls and other races or seats on the insides of the yoke for center balls, and said center and surrounding balls, substantially as described.

3. A ball-bearing having a center ball and a seat or race therefor, and a series of surrounding balls having an independent race or casing, substantially as described.

4. A ball-bearing consisting of a single ball bearing on a ball-seat comprising a series of balls, substantially as described.

In testimony whereof I affix my signature in presence of two witnesses.

FRANK J. DYETT.

Witnesses:
GEO. B. ROWELL,
OSCAR OLSON.